(12) United States Patent
Dary (10) Patent No.: US 8,775,372 B2
(45) Date of Patent: Jul. 8, 2014

(54) RETRIEVING HISTORICAL OBJECT-RELATED CONFIGURATION DATA

(71) Applicant: Red Hat Israel, Ltd., Raanana (IL)

(72) Inventor: Yaniv Dary, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 57 days.

(21) Appl. No.: 13/666,299

(22) Filed: Nov. 1, 2012

(65) Prior Publication Data

US 2014/0122427 A1     May 1, 2014

(51) Int. Cl.
     *G06F 17/30*      (2006.01)

(52) U.S. Cl.
     CPC ...... *G06F 17/30286* (2013.01); *G06F 17/3061* (2013.01); *G06F 17/30283* (2013.01); *G06F 17/30073* (2013.01)
     USPC ........... 707/610; 707/614; 707/617; 707/620; 709/201; 709/203; 709/213; 709/217

(58) Field of Classification Search
     CPC .......... G06F 17/30286; G06F 17/3061; G06F 17/30283; G06F 17/30073
     USPC .......... 707/610, 614, 617, 620; 709/201, 203, 709/213, 217
     See application file for complete search history.

(56) References Cited

U.S. PATENT DOCUMENTS

| 7,587,473 | B2 * | 9/2009 | Benco et al. | 709/220 |
| 8,204,855 | B2 * | 6/2012 | Salmon et al. | 707/610 |
| 2005/0071194 | A1 * | 3/2005 | Bormann et al. | 705/2 |
| 2005/0085225 | A1 * | 4/2005 | Benco et al. | 455/424 |
| 2011/0004668 | A1 * | 1/2011 | Salmon et al. | 709/208 |

* cited by examiner

*Primary Examiner* — Frantz Coby
(74) *Attorney, Agent, or Firm* — Lowenstein Sandler LLP (57) ABSTRACT

A method for historically synchronizing configuration data of a computer network is provided. A network management server collects from a first database a first plurality of configuration tables corresponding to a plurality of entities in the computer network according to a hierarchy of the entities when an entity in the computer network has changed. The network management server identifies the entity that has changed. The network management server adds a history identifier to an entity configuration table of the first plurality of configuration tables. The entity configuration table corresponds to the entity that has changed. The network management server updates a second plurality of configuration tables in a second database with the first plurality of configuration tables.

20 Claims, 5 Drawing Sheets

RETRIEVING HISTORICAL OBJECT-RELATED CONFIGURATION DATA

TECHNICAL FIELD

Embodiments of the present invention relate to computer networks, and more specifically, to a method and system for managing and retrieving historical configuration and statistical data of a computer network.

BACKGROUND

Organizations currently use complex computer networks comprised of multiple resources, such as real and virtual machines and associated real and virtual hosts and peripheral devices, respectively. These virtual machines, hosts, and devices may be integrated into clusters and clusters further integrated into data centers. The data centers may be further integrated into a cloud. A system administrator that operates a network management system may have such duties as allocating system resources quickly and efficiently to keep such systems running smoothly. When a problem with one or more resources occurs, the network management system needs to quickly identify the problem resource(s), and allocate more or alternative resources.

A centralized data collection database may be employed by the network management system to track configuration data of computer system entities and statistical data associated with each of the computer system entities. Unfortunately, these databases may include a large amount of redundant configuration data stored in configuration and/or related statistical table. Such an explosion of redundant data may result in slow database access and data retrieval times to create system congestion and reduced system response time. Further, storing very large amounts of data as a result of creating and maintaining a multiplicity of virtual machines and resources may result in the need for additional data storage devices, thus increasing system costs.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for historically synchronizing configuration data of a computer network are described herein. A network management server collects from a first (non-historical) database a first plurality of configuration tables corresponding to a plurality of entities in the computer network according to a hierarchy of the entities when an entity in the computer network has changed. The network management server identifies the entity that has changed. The network management server assigns a unique history identifier to a history identifier field in an entity configuration table of the first plurality of configuration tables corresponding to the entity that has changed. The network management server updates a second plurality of configuration tables in a second (historical) database with the first plurality of configuration tables. The entities may be computer system (or computer network) entities (e.g., virtual machines, hosts machines, clusters of hosts, data centers, etc.). The historical identifier may be a binary number representing a snapshot id of a particular entity (e.g., a virtual machine) at a particular moment in time.

In an embodiment, the first plurality of configuration tables may be traversed in order from higher complexity entities to lower complexity entities.

In one embodiment, statistical tables corresponding to the configuration tables may be collected and assigned the corresponding historical identifier and the second database may be updated accordingly. In this way, the second database becomes a historical database.

Methods and systems for retrieving historical data from a historical database are described herein. The network management server retrieves an entity configuration table in the historical database arranged according to a hierarchy of entities, the entity configuration table comprising a history identifier field corresponding to a most recent version of an entity. The network management server retrieves an entity statistical table from the database, the entity statistical table comprising a version field corresponding to the most recent version of the entity. The network management server joins the entity configuration table using a unique entity identifier stored in an entity identifier field as a primary key with the entity statistical table using a unique entity identifier field as a foreign key to create a joined table. The network management server extracts configuration data and/or statistical data from the joined table corresponding to the entity. The network management server presents the configuration data and/or statistical data on a display to a user.

In one embodiment, the network management server successively joins a plurality of configuration tables using a history identifier stored in a corresponding identifier field as a foreign key with a plurality of statistical tables with the version field as a primary key for successive higher level entities in the hierarchy to create a second joined table. The network management server extracts configuration data and/or statistical data from the second joined table corresponding to the entities in the hierarchy. The network management server presents the statistical data based on versions of the entity for each row on a display to the user to provide a snapshot of the system at a specific point in time and trends of the system.

Embodiments of the present disclosure that create and extract data from a historical database may derive trend data over time for one or more entities (e.g., virtual machines, hosts machines, clusters of hosts, data centers, etc.) to identify and correct problems in a computer network before or when they occur. Employing the historical database in this manner can provide for offloading and re-allocating resources to considerably reduce congestion and thus processing time in a network management server and the computer network as a whole.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
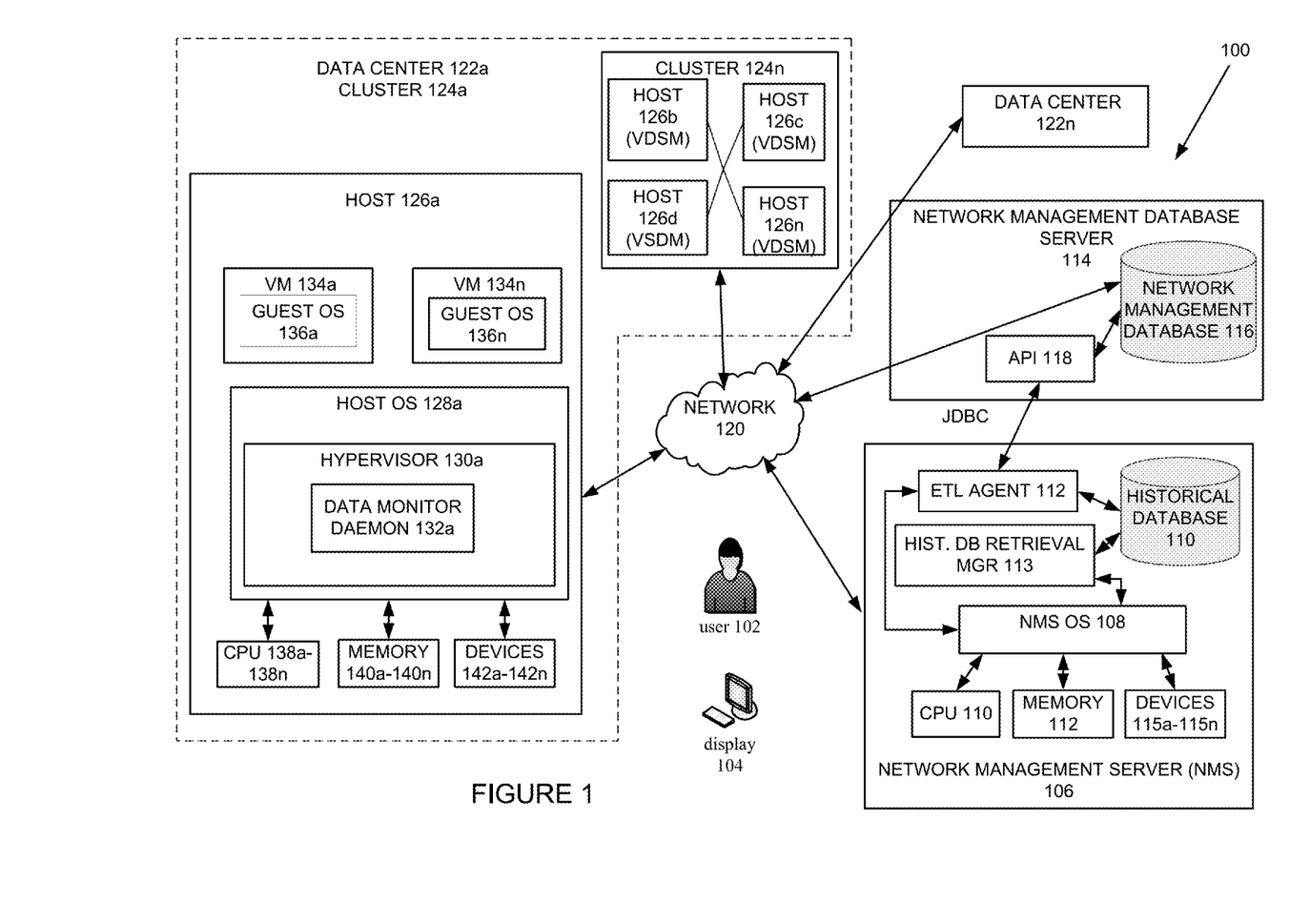
FIG. 1 is a block diagram of a network architecture in which embodiments of the present disclosure may operate.

FIG. 1 is a block diagram of a network architecture 100 in which embodiments of the present disclosure may operate. The network architecture 100 may represent a computer network that includes a network management server (NMS) 106 for monitoring one or more data centers 122a-122n. In one embodiment, the NMS 106 is configured to collect, store, and retrieve configuration and statistical data gathered from computer system entities comprising the one or more data centers 122a-122n in a network management database 116 controlled by a network management database server 114.

In one embodiment, the computer system entities comprising the one or more data centers 122a-122n may be one or more clusters 124a-124n of one or more host machines (also referred to as a host) 126a-126n. In one embodiment, the one or more hosts 126a-126n may each comprise one or more virtual machines 134a-134n. The servers 106, 114, the data centers 122a-122n, the clusters 124a-124n, and the hosts 126a-126n may be connected by a network 120. Each of the servers 106, 114 and the hosts 126a-126n may be a computing device such as, for example, desktop computers, personal computers (PCs), server computers, mobile phones, palm-sized computing devices, personal digital assistants (PDAs), tablet devices, etc. Each of the servers 106, 114 and the hosts 126a-126n may include one or more central processing units (CPUs) (e.g., 133a-138n, 110) respectively, configured to store and read data and programs from a corresponding memory (140a-140n, 112), respectively and control corresponding peripheral devices (e.g., 142a-142n).

In embodiments, the host 126a may be, for example, a server computer, a gateway computer or any other suitable computer system that is configurable for operating as a host. The host 126a may comprise an operating system 128a and a hardware platform. The host operating system 128a may include Microsoft Windows®, Linux®, Solaris®, Mac® OS or any other suitable operating system for managing operations on the host 126a.

The hardware platform may include one or more central processing units (CPUs) 138a, memory 140a, and peripheral devices 142a-142n. The devices 142a-142n may be comprised of one or more hardware and software devices, which may be located internally and externally to the host 126a. Examples of the devices 142a-142n may include network interface controllers, sound or video adaptors, photo/video cameras, printer devices, keyboards, displays or any other suitable device intended to be coupled to a computer system. Examples of the memory 140a may include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), etc.

The host 126a may be configured with one or more virtual machines (VMs) 134a-134n. A VM (e.g., 134a) is a portion of software that, when executed on appropriate hardware, creates an environment allowing the virtualization of an actual physical computer system. The VM 134a may function as a self-contained platform, comprising one or more virtual CPUs (not shown), virtual memory (not shown), and virtual devices (not shown) running under the control of a guest operating system 136a. The guest operating systems 136a may be the same or different operating system from the host operating system 128a. Similar to the host operating system 126a, the guest operating system 136a may include Microsoft Windows®, Linux®, Solaris®, Mac® OS or any other suitable operating system for managing operations associated with a virtualization environment.

The hypervisor 130a, which emulates the underlying hardware platform for the VMs 134a-134n, is provided and may run on the host OS 128a. A hypervisor is also known as a virtual machine monitor (VMM), a kernel-based hypervisor or a host operating system. The hypervisor 130a may support multiple VMs 134a-134n residing on the host 126a. Alternatively, more than one hypervisor 130a (not shown) may be provided to support multiple VMs 134a-134n residing on the host 126a. The hypervisor 130a is configured to emulate the one or more virtual CPUs, the virtual memory, and virtual peripheral devices in cooperation with the virtual device drivers (not shown) residing on a virtual machine (e.g., 134a).

In one embodiment, the hypervisor 130a may be configured to provide a data monitor daemon 132a comprising a plurality of threads/processes of execution (e.g., Java applets, not shown) for monitoring and collecting configuration data and statistical data (of computer system entities (e.g., CPU, memory, devices, OSs) associated with the host 126a and the VMs 134a-134n (including the host 126a and of the VMs 134a-134n, themselves). The data monitor daemon 132a is configured to sample configuration data (e.g., a historical identifier, an entity/object identifier, operating system, entity type, memory size, etc.) of the computer system entities followed by statistical data (e.g., a historical identifier, an entity/object identifier, status, cpu usage, memory usage, configuration version, etc.) associated with the computer system entities at periodic intervals (e.g., once per minute, per hour, per day, etc., depending on a type of computer system entity).

The network management database server 114 is configured to obtain the periodically sampled configuration data and associated statistical data from the data monitor daemon (e.g., 132a) at the periodic intervals and store the collected data in a plurality of tables in a network management database 116. The tables in the network management database 116 are organized according to a hierarchy of computer system entities. The hierarchy of entities may be based on an ordering from higher complexity entities to lower complexity entities. The order may be, for example, by data center, clusters of hosts, hosts, devices associated with corresponding hosts, virtual machines associated with corresponding hosts, and virtual devices associated with corresponding virtual machines, etc. For each computer system entity, there is at least one table each for configuration data and statistical data. Every row in one of the tables corresponds to an individual polling of configuration or statistical parameters of a monitored entity for a specific collection time.

In one embodiment, queries submitted by the network management server (NMS) 106 for data may be directed to the network management database 116 under the control of the network management database server 114 using an application programming interface (API) 118. In one embodiment, queries to the network management database 116 may be in a form of structured query language (SQL). In one embodiment, a version of SQL employed may be Java database connectivity (JDBC).

In one embodiment, the network management server (NMS) 106 may be configured to communicate with the data centers 122a-122n, the clusters 124a-124n, and the hosts 126a-126n over the network 120. In embodiments, the network management server (NMS) 106 may be configured to communicate with the network management database server 114 through the API 118 using JDBC either indirectly over the network 432, directly over a wired or wireless LAN or WAN, or may be integrated with the network management data server 114. The NMS 106 may include a computing machine such as, for example, a server computer, a gateway computer, or any other suitable computer system that is configurable for operating as an NMS 106. The NMS 106 comprises an NMS operating system (OS) 108 and a hardware platform. The NMS operating system 108 may include Microsoft Windows®, Linux®, Solaris®, Mac® OS or any other suitable operating system for managing operations on the NMS 106.

The hardware platform may include one or more central processing units (CPUs) 110, memory 112, and devices 115a-115n. The devices 115a-115n may be comprised of one or more hardware and software devices, which may be located internally and externally to the NMS 106. An example of the devices (e.g., 115a) may include a network interface controller (NIC) such as an Ethernet network card for communication over the network 120. The network 120 may be a private network (e.g., a local area network (LAN), wide area network (WAN), intranet, etc.) or a public network (e.g., the Internet).

Other examples of the devices 115a-115n may include sound or video adaptors, photo/video cameras, printer devices, keyboards, displays, or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.).

In one embodiment, the NMS 106 is configured to monitor and collect configuration and statistical data associated with the computer system entities (e.g., the data centers 122a-122n, the clusters 124a-124n, the hosts 126a-126n, and the VMs 134a-134n) from the network management database 116 via an extract, transform, and load (ETL) agent 112. As used herein, extract, transform, and load (ETL) refers to a process that involves extracting data from outside sources (e.g., the network management database 116), transforming the data to fit operational needs (e.g., identify historical trends of the state of computer system entities), and loading the transformed data into an end target (i.e., the historical database 110).

In an embodiment, the ETL agent 112 is configured to collect the non-historically organized configuration data and statistical data associated with the computer system entities from the network management database 116. The configuration data is collected whenever a state (e.g., installation, removal, or change of a parameter) of one or more computer system entities changes (i.e., not for every sampling of data). The ETL agent 112 and the data monitor daemons 132a-132n, in contrast collect statistical data once every sampling period. The ETL agent 112 is further configured to identify the one or more computer system entities that have changed state, to assign a unique history identifier (e.g., version number that increases with each change of state of an entity) to a history identifier field in a corresponding configuration table and statistical table collected from the network management database 116, and to update a corresponding configuration table and statistical table in a historical database 110.

The database 110 is historical in the sense that the unique history identifier may be employed by a history database retrieval manager 113 to retrieve and present configuration data and/or statistical data on a display 104 to the user 102 (e.g., a network system administrator) to provide a snapshot of the system 100 at a specific point in time. In an embodiment, the history database retrieval manager 113 may be configured to request successive joins from the historical database 110 using the history identifier stored in identifier fields of configuration tables as foreign keys with version fields as primary keys in corresponding statistical tables for successive higher level entities in the hierarchy to create joined tables that identify trend data over time for one or more computer system entities. In another sense, the database 110 is organized historically by means of the historical identifiers associated with corresponding computer system entities.

Figure 2:
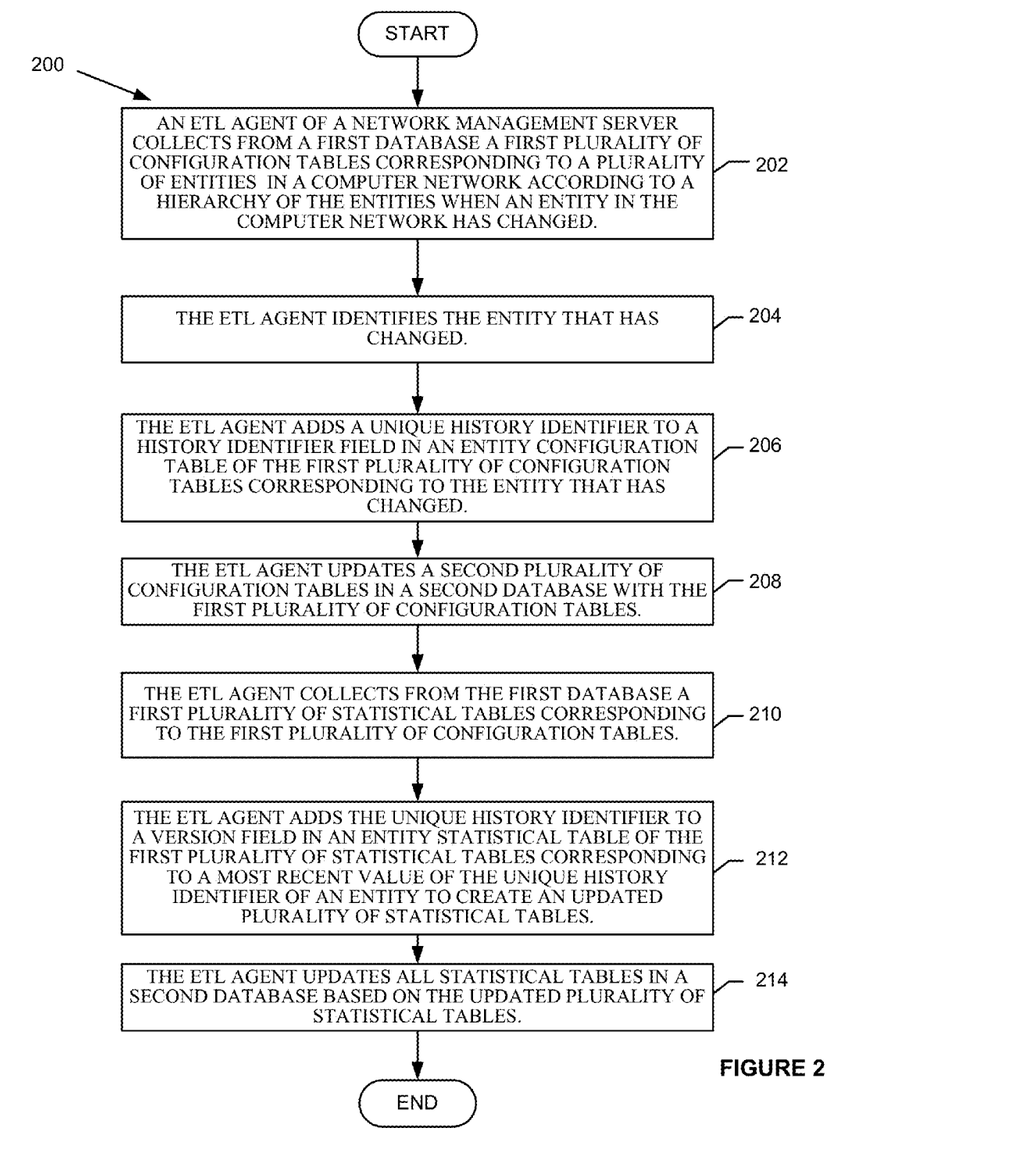
FIG. 2 is a flow diagram illustrating of one embodiment of a method for historically synchronizing configuration data of a computer network.

FIG. 2 is a flow diagram illustrating of one embodiment of a method 200 for historically synchronizing configuration data of a computer network. Method 200 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 200 is performed by the ETL agent 112 of the network management server (NMS) 106 of FIG. 1.

In one embodiment, method 200 begins when, at block 202, configuration synchronization is performed. The ETL agent 112 collects from a first database a first plurality of configuration tables corresponding to a plurality of entities in a computer network according to a hierarchy of the entities when an entity in the computer network has changed. In one embodiment, a data monitor daemon 132a receives a notification that a computer entity (e.g., the VM 134a) has changed state (e.g., received additional virtual memory). The network management database sever 114 automatically collects a current set of samples of configuration data and statistical data for all computer system entities of the system 100. The network management database sever 114 notifies the ETL agent 112 that a change of state of the VM 134a has occurred. In response, the ETL agent 112 transmits a JDBC SQL query message to the API 118 of network management database server 114 to collect the complete set of configuration tables from the network management database 116 according to a hierarchy of the entities.

In one embodiment, the system configuration tables are collected in a top-down order from higher complexity entities to lower complexity entities. An example of a top-down order may be by data center, clusters of hosts, hosts, devices associated with corresponding hosts, virtual machines associated with corresponding hosts, and virtual devices associated with corresponding virtual machines. This is in order to create a historical version of the system configuration tables that corresponds to the changes that have occurred in top level entities. A collection of statistical tables corresponding to the entities in the configuration tables may also be collected following the collection of all configuration tables in the hierarchy (e.g., a configuration synchronization followed by a statistical synchronization of collection of entities in order to permit insertion of history version fields with latest values, e.g., virtual machines configuration followed by virtual machine statistics).

At block 204, the ETL agent 112 identifies the entity (e.g., VM 134a) that has changed. In one embodiment, configuration data of the entity that has changed state (e.g., the amount of virtual memory allocated to the VM 134a) may be transmitted in a message by the corresponding data monitor daemon 134a to the network management database server 114 for later transmission to the ETL agent 112 during execution of block 202. In another embodiment, the corresponding data monitor daemon 134a may be configured to asynchronously transmit the change in state of the entity over the network 120 directly to the ETL agent 112. In one embodiment, this asynchronous message may be employed by the ETL agent 112 to trigger the collection of samples of configuration data and statistical data.

At block 206, the ETL agent 112 adds a unique history identifier (e.g., a binary number corresponding to an integer, for example, #defined as or enumerated as "VM134a_version2") to a history identifier field in an entity configuration table of the first plurality of configuration tables corresponding to the entity that has changed. In one embodiment, the most recent version of the unique history identifier may be higher in value than a previous version of the unique history identifier (e.g., VM134a_version1"). In one embodiment, the unique history identifier changes version only when a parameter in a table associated with the entity (e.g., VM 134a) has changed.

Figure 3:
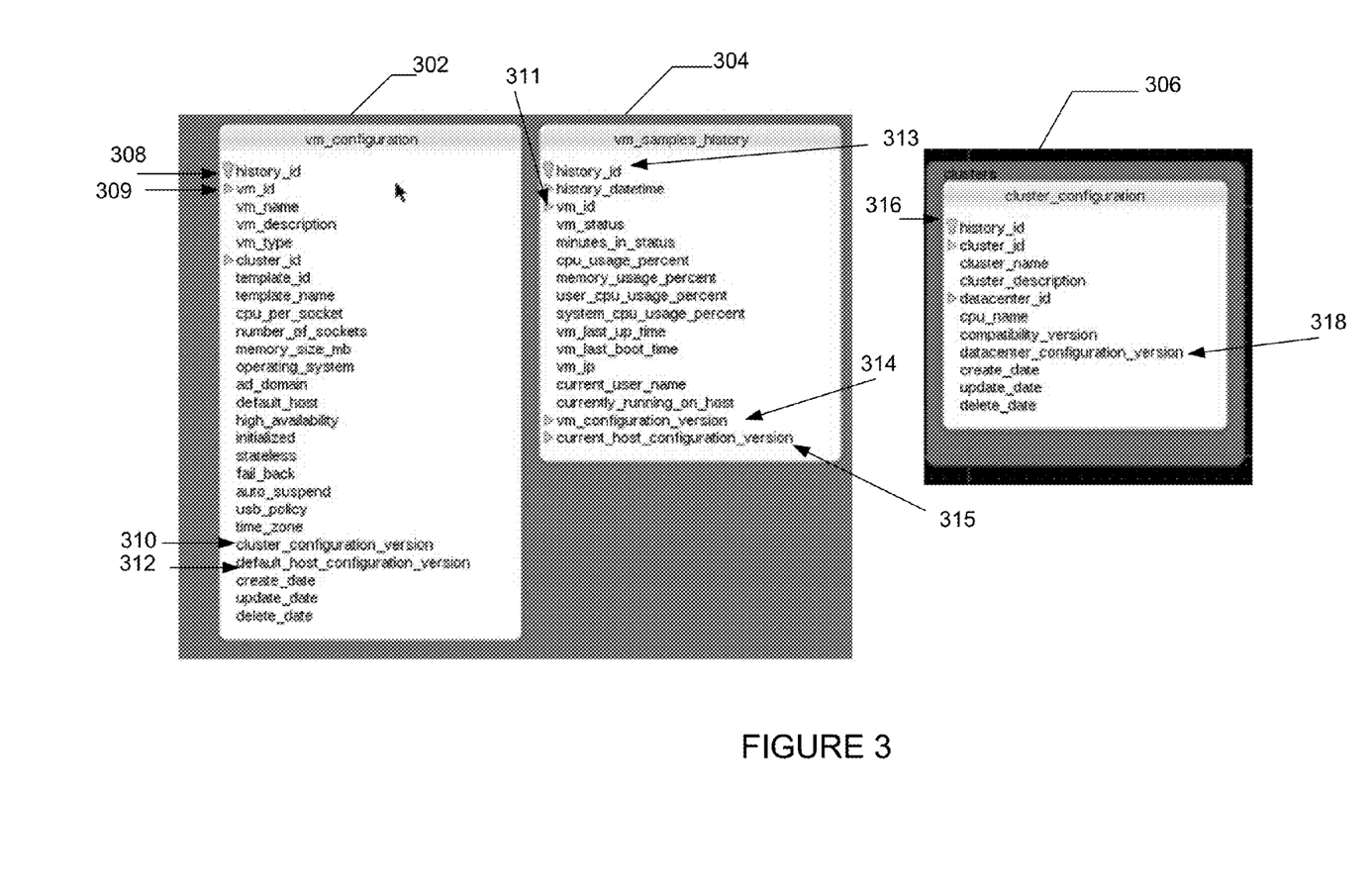
FIG. 3 shows a configuration table corresponding to a virtual machine taken at a particular sample period and an associated statistical table corresponding to the same virtual machine.

FIG. 3 shows a configuration table 302 corresponding to a VM taken at a particular sample period ("vm_configuration") and an associated entity statistical table 304 corresponding to the same VM ("vm_sample_history"). Also shown is a cluster configuration table 306 that corresponds to the cluster of hosts (e.g., 124a) to which the VM (e.g., 134a) belongs.

The network management server updates a second plurality of configuration tables in a second database with the first plurality of configuration tables. Each of the tables 302, 304, 306 comprises a history_id field (308, 313, 316, respectively) for storing unique history version identifiers. The unique history version identifiers of each of the tables 308, 313, 316 are retrieved for each sample period. Every time a statistical synchronization is performed, a most recent value in the history_id field (e.g., 308) for that virtual machine is inserted into a vm_configuration_version field (e.g., 314) to permit trend reporting. When, for example, virtual memory is added to VM 134a, then the ETL agent 112 assigns "VM134a_version2" to history_id field 308 and in all subsequent statistical synchronizations the new value of the history_id field (e.g, 308) will be inserted into a corresponding vm_con figuration version field (e.g., 314).

At block 208, the ETL agent 112 updates a second plurality of configuration tables in a second database with the first plurality of configuration tables. In one embodiment, the ETL agent 112 updates a complete system set of configuration tables in the historical database 110 with the complete set of configuration tables previously collected from the network management database 116, except with the updated history identifier field of the computer system entity (e.g., VM 134a) that has changed state (e.g., the history_id field 308 of table 302).

In one embodiment, at block 210, a statistical synchronization is performed. The ETL agent 112 collects from the first database (i.e., the network management server 116) a first plurality of statistical tables corresponding to the first plurality of configuration tables. At block 212, the ETL agent 112 adds the unique history identifier (e.g., "VM134a_version2") to a version field (e.g., vm_configuration_version 314) in an entity statistical table (e.g., 304) of the first plurality of statistical tables corresponding to a most recent value of the unique history identifier of an entity to create an updated plurality of statistical tables (e.g., the most recent value for each vm_history_id field 308 may be inserted into a corresponding vm statistics vm_configuration_version field 314). In one embodiment, at block 212, the ETL agent 112 may add the unique history identifier by first performing a join of the retrieved most recent value of the configuration table 302 corresponding to the entity that has changed (e.g., VM 134a) using an entity identifier field 309 (e.g., vm_id) in the configuration table 302 with the corresponding statistical table 304 using the corresponding entity identifier field 319 (e.g., vm_id) in the statistical table 304 to create a joined table. The ETL agent 112 may then extract the unique history identifier (e.g., "VM134a_version2") from the history identifier field 308 of the joined table. At block 214, the ETL agent 112 may then store the unique history identifier 308 in the version field 314 of the statistical table 304. At block 214, the ETL agent 112 updates all statistical tables in a second database based on the updated plurality of statistical tables (i.e. the history database 110).

Figure 4:
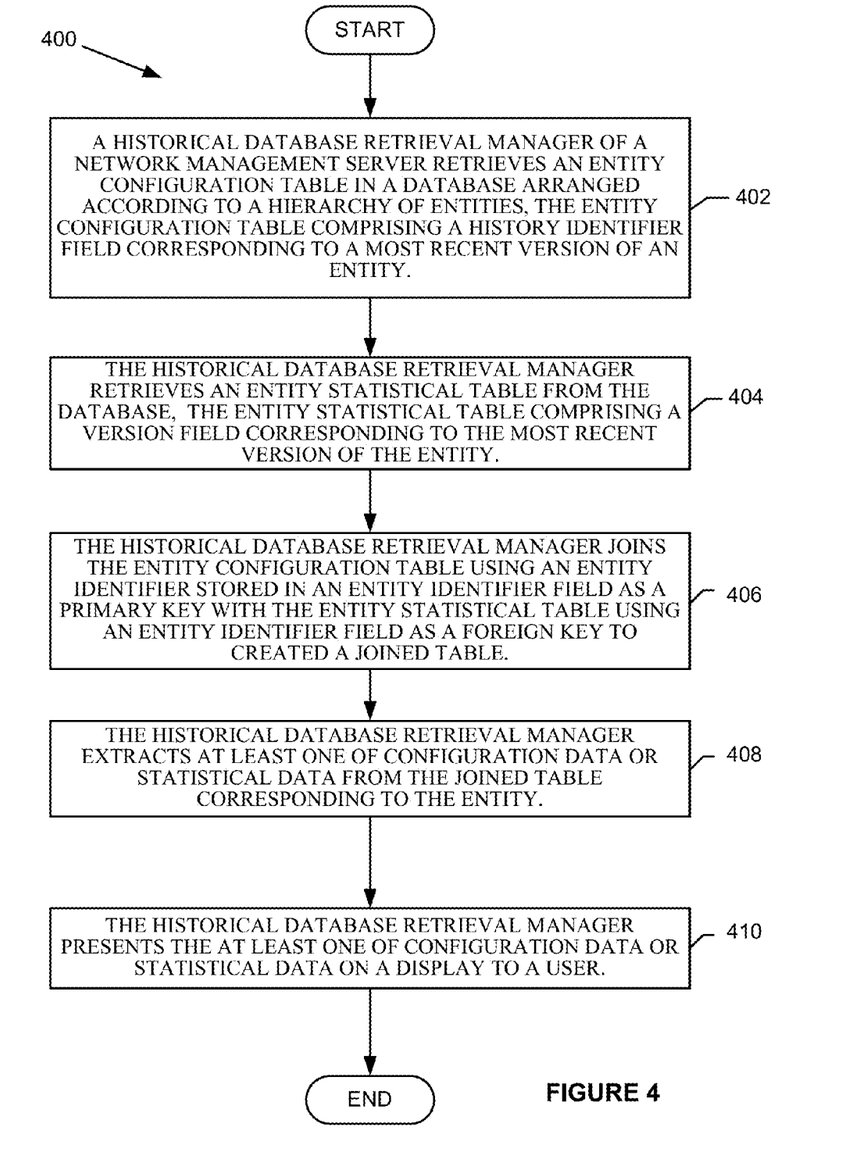
FIG. 4 is a flow diagram illustrating of one embodiment of a method for retrieving historical data of a computer network.

FIG. 4 is a flow diagram illustrating of one embodiment of a method 400 for retrieving historical data of a computer network. Method 400 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 400 is performed by the historical database retrieval manager 113 of the network management server (NMS) 106 of FIG. 1.

In one embodiment, method 400 begins when, at block 402, the historical database retrieval manager 113 retrieves an entity configuration table in a database arranged according to a hierarchy of entities, the entity configuration table comprising a history identifier field corresponding to a most recent version of an entity. For example, the historical database retrieval manager 113 may retrieve the entity configuration table 302 corresponding to a VM (e.g., VM 134a) from the historical database 110. At block 404, the historical database retrieval manager 113 retrieves an entity statistical table from the database, the entity statistical table comprising a version field corresponding to the most recent version of the entity. For example, the historical database retrieval manager 113 may retrieve the entity statistical table 304 corresponding to a VM (e.g., VM 134a) from the historical database 110. At block 406, the historical database retrieval manager 113 joins the entity configuration table (e.g., 302) using a unique entity identifier stored in a unique entity identifier field (e.g., 309) as a primary key with the entity statistical table (e.g., 304) using a unique entity identifier field (e.g., 311) as a foreign key to created a joined table (not shown). At block 408, the historical database retrieval manager 113 extracts at least one of configuration data or statistical data from the joined table corresponding to the entity (e.g., VM 134a). The historical database retrieval manager 113 presents the at least one of configuration data or statistical data on a display (e.g. 104) to a user (e.g., 102).

In one embodiment, the entity historical table (e.g., 302) may comprise a field for storing an identifier corresponding to a version of a higher level entity (e.g., 312 and 310) in the hierarchy. In one embodiment, the entity statistical table (e.g., 304) may comprise a field for storing an identifier corresponding to a version of a higher level entity (e.g., 315) in the hierarchy. In one embodiment, the historical database retrieval manager 113 may successively join a plurality of configuration tables using a history identifier stored in a corresponding identifier field as the primary foreign key with a plurality of statistical tables with the version field as the primary key for successive higher level entities in the hierarchy to create a second joined table. For example, the historical database retrieval manager 113 may join VM configuration table 302 using key 308 with the VM statistical table 304 using foreign key 314 to obtain the virtual machine (e.g., 134n). Then the historical database retrieval manager 113 may join VM configuration table 302 using key 310 with the corresponding cluster configuration table 306 using primary key 316 corresponding to the respective cluster (e.g., 124a) and from that to the data center (e.g., 122a). These combined tables (not shown) may be further combined with corresponding statistical tables and/or other configuration tables (e.g., corresponding to the virtual machine 134n (not shown)) to obtain and present configuration data and/or statistical data of the entire hierarchy of computer system entities in the system 100 to provide a snapshot of the system 100 at a specific point in time. The extracted data may further be employed to ascertain trend data over time for an entity. For example, a chart may be displayed on the display 104 to the user 102 that indicates the amount of virtual memory over time for a specific virtual machine (e.g., 134a). This may be employed to ascertain load distribution or determine if virtual memory is being consistently under deployed or over deployed. In response, the user 102 (e.g., a system administrator) may direct the system 100 to add or subtract virtual memory, respectively to better distribute the load.

Figure 5:
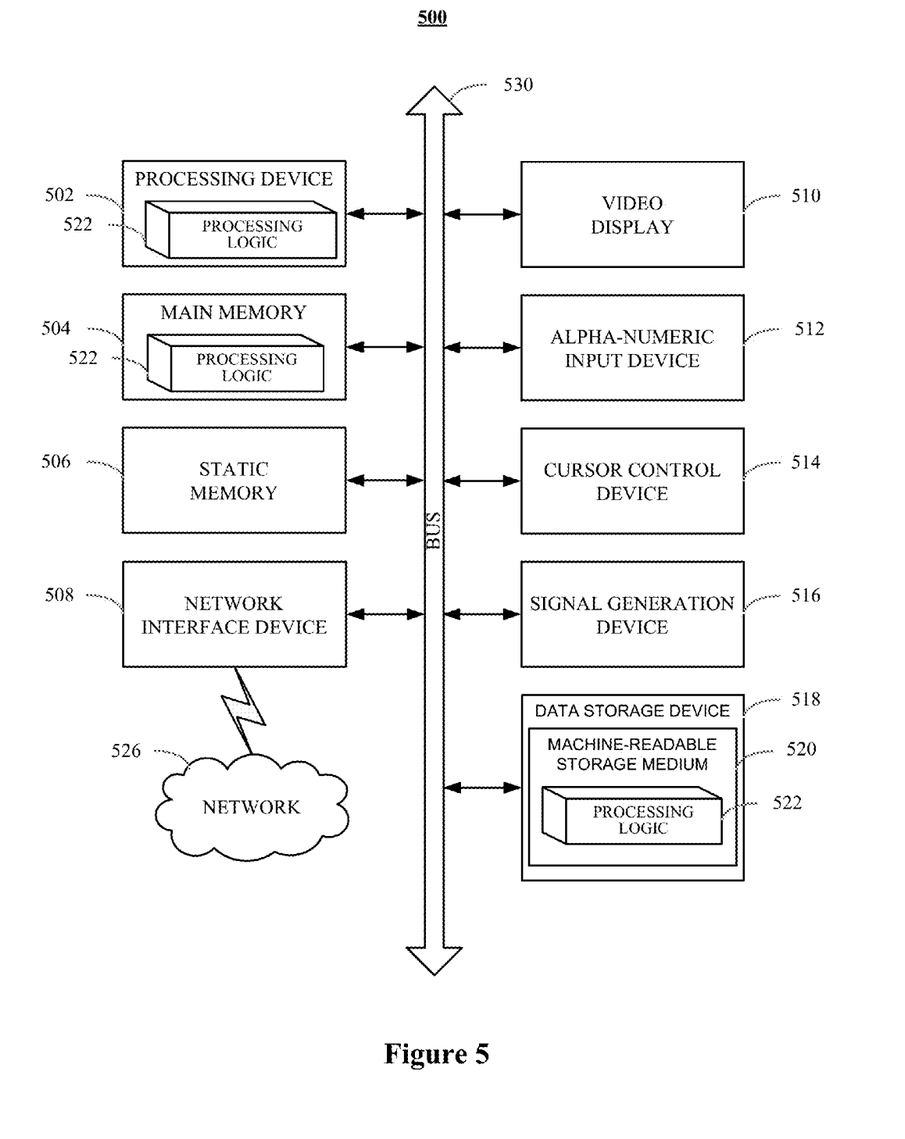
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 1230.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. Processing device 502 is configured to execute processing logic 522 for implementing at least one of the ETL agent 112 or the historical database retrieval manager 113 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (i.e., processing logic 522) embodying any one or more of the methodologies of functions described herein. The processing logic 522 may also reside, completely or at least partially, within main memory 504 and/or within processing device 502 during execution thereof by computer system 500; main memory 504 and processing device 502 also constituting machine-readable storage media. The processing logic may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for historically synchronizing configuration data of a computer network, comprising:
   collecting, from a first database by a configuration server, a first plurality of configuration tables corresponding to a plurality of entities in the computer network according to a hierarchy of the entities when an entity in the computer network has changed;
   identifying the entity that has changed;
   adding a history identifier to an entity configuration table of the first plurality of configuration tables, the entity configuration table corresponding to the entity that has changed; and
   updating a second plurality of configuration tables in a second database with the first plurality of configuration tables.

2. The method of claim 1, wherein the entities are computer system entities.

3. The method of claim 1, wherein collecting the first plurality of configuration tables according to the hierarchy of entities comprises traversing the first plurality of configuration tables in order from higher complexity entities to lower complexity entities.

4. The method of claim 3, wherein traversing the first plurality of configuration tables in order from higher complexity entities to lower complexity entities comprises traversing the first plurality of configuration tables in order by data center, clusters of hosts, hosts, devices associated with corresponding hosts, virtual machines associated with corresponding hosts, and virtual devices associated with corresponding virtual machines.

5. The method of claim 1, wherein the second database is ordered historically according to a most recent version of the history identifier for each of the plurality of entities.

6. The method of claim 5, wherein the most recent version of the history identifier is higher in value than a previous version of the history identifier.

7. The method of claim 1, wherein the history identifier changes version when a parameter in a table associated with the entity changes.

8. The method of claim 1, further comprising:
   collecting, from the first database by the configuration server, a first plurality of statistical tables corresponding to the first plurality of configuration tables;
   adding the history identifier to a version field in an entity statistical table of the first plurality of statistical tables corresponding to a most recent value of the history identifier to create an updated plurality of statistical tables; and
   updating all statistical tables in a second database based on the updated plurality of statistical tables.

9. The method of claim 8, wherein adding the history identifier to the entity statistical table comprises:
   joining a most recent version of an entity configuration table with the entity statistical table to create a joined table;
   extracting the history identifier from a history identifier field of the joined table; and
   storing the history identifier in a version field of the statistical table.

10. The method of claim 1, wherein the history identifier is a binary number.

11. A computer system, comprising:
    a memory;
    a processing device, coupled to the memory, the processor configured to:
      collect, from a first database, a first plurality of configuration tables corresponding to a plurality of entities in the computer network according to a hierarchy of the entities when an entity in the computer network has changed;
      identify the entity that has changed;
      add a history identifier to an entity configuration table of the first plurality of configuration tables, the entity configuration table corresponding to the entity that has changed; and
      update a second plurality of configuration tables in a second database with the first plurality of configuration tables.

12. The system of claim 11, wherein the entities are computer system entities.

13. The system of claim 11, wherein the processor is further configured to:
    collecting, from the first database, a first plurality of statistical tables corresponding to the first plurality of configuration tables;
    adding the history identifier to a version field in an entity statistical table of the first plurality of statistical tables corresponding to a most recent value of the history identifier to create an updated plurality of statistical tables; and updating all statistical tables in a second database based on the updated plurality of statistical tables.

14. The system of claim 13, wherein adding the history identifier to the entity statistical table comprises:
joining a most recent version of an entity configuration table with the entity statistical table to create a joined table;
extracting the history identifier from a history identifier field of the joined table; and
storing the history identifier in a version field of the statistical table.

15. The system of claim 11, wherein the unique history identifier changes version only when a column in a table associated with the entity changes.

16. A non-transitory computer-readable storage medium including instructions that, when accessed by a processing system, cause the processing system to perform a method for retrieving historical data of a computer network, the method comprising:
retrieving, by a historical database retrieval manager of a network management server, an entity configuration table comprising a history identifier field corresponding to a most recent version of an entity;
retrieving an entity statistical table from the database, the entity statistical table comprising a version field corresponding to the most recent version of the entity;
joining the entity configuration table using a history identifier stored in the history identifier field as a foreign key with the entity statistical table using the version field as a primary key to created a joined table;
extracting at least one of configuration data or statistical data from the joined table corresponding to the entity; and
presenting the at least one of configuration data or statistical data on a display to a user.

17. The non-transitory computer-readable storage medium of claim 16, wherein the entity is computer system entity.

18. The non-transitory computer-readable storage medium of claim 16, wherein the entity statistical table and the entity statistical table each comprises a field for storing an identifier corresponding to a version of a higher level entity in the hierarchy.

19. The non-transitory computer-readable storage medium of claim 18, further comprising:
successively joining a plurality of configuration tables using a history identifier stored in a corresponding identifier field as the foreign key with a plurality of statistical tables with the version field as the primary key for successive higher level entities in the hierarchy to create a second joined table;
extracting at least one of configuration data or statistical data from the second joined table corresponding to the entities in the hierarchy; and
presenting the at least one of configuration data or statistical data based on the entities on a display to the user to provide a snapshot of the system at a specific point in time.

20. The non-transitory computer-readable storage medium of claim 19, further comprising deriving trend data over time for an entity based on the extracting.

* * * * *